United States Patent
Xu

(10) Patent No.: US 11,999,279 B2
(45) Date of Patent: Jun. 4, 2024

(54) SEAT CUSHION STRUCTURE CAPABLE OF ADJUSTING SOFTNESS AND HARDNESS

(71) Applicant: Qing Xu, ShangHai (CN)

(72) Inventor: Qing Xu, ShangHai (CN)

( * ) Notice: Subject to any disclaimer, the term of this patent is extended or adjusted under 35 U.S.C. 154(b) by 44 days.

(21) Appl. No.: 17/887,251

(22) Filed: Aug. 12, 2022

(65) Prior Publication Data
US 2022/0379788 A1 Dec. 1, 2022

Related U.S. Application Data

(63) Continuation of application No. PCT/CN2020/091953, filed on May 23, 2020.

(51) Int. Cl.
| | |
|---|---|
| *B60N 2/70* | (2006.01) |
| *A47C 7/02* | (2006.01) |
| *A47C 7/14* | (2006.01) |
| *A47C 7/34* | (2006.01) |
| *B60N 2/90* | (2018.01) |

(52) U.S. Cl.
CPC .............. *B60N 2/90* (2018.02); *A47C 7/025* (2013.01); *A47C 7/14* (2013.01); *A47C 7/345* (2013.01); *B60N 2/7011* (2013.01)

(58) Field of Classification Search
CPC ........... A47C 7/14; A47C 7/025; A47C 7/287; A47C 7/345; B60N 2/7011
See application file for complete search history.

(56) References Cited

U.S. PATENT DOCUMENTS

| | | | |
|---|---|---|---|
| 4,671,569 A | 6/1987 | Kazaoka et al. | |
| 9,873,364 B2* | 1/2018 | Hamabe | B60N 2/68 |
| 10,239,421 B2* | 3/2019 | Katoh | B60N 2/686 |
| 10,682,938 B2* | 6/2020 | Katoh | B60N 2/682 |
| 10,988,063 B2* | 4/2021 | Katoh | B60N 2/682 |
| 11,458,874 B2* | 10/2022 | Nagai | B60N 2/026 |
| 2015/0239381 A1* | 8/2015 | Hamabe | B60N 2/39 297/313 |
| 2017/0164746 A1* | 6/2017 | Phillips | A47C 7/029 |
| 2020/0122616 A1* | 4/2020 | Nageshkar | B60N 2/68 |

FOREIGN PATENT DOCUMENTS

| | | |
|---|---|---|
| CN | 2217550 Y | 1/1996 |
| CN | 104039594 A | 9/2014 |
| CN | 205513617 U | 8/2016 |
| CN | 109760566 A | 5/2019 |

(Continued)

*Primary Examiner* — Timothy J Brindley

(57) ABSTRACT

A seat cushion structure capable of adjusting softness and hardness, comprising a cushion sponge (1), a wheel-spoke seat inner housing (2), a seat sponge (3) and a seat outer housing (4), which are sequentially disposed from top to bottom; a coil spring (11) is fixedly provided on the wheel-spoke seat inner housing (2); an adjustment handle (5) is provided outside the seat outer housing (4), an adjustment mechanism is connected to the adjustment handle (5) and provided inside the seat outer housing (4); the adjustment mechanism is also connected to the coil spring (11), configured for adjusting contraction radius of the coil spring (11); the adjustment mechanism is capable of adjusting contraction radius of the coil spring (11) since being controlled by the adjustment handle (5), thereby the softness and hardness of the seat cushion structure is adjusted.

7 Claims, 10 Drawing Sheets

(56) References Cited

FOREIGN PATENT DOCUMENTS

| CN | 211809224 | U |   | 10/2020 |            |
|----|-----------|---|---|---------|------------|
| CN | 113812789 | A | * | 12/2021 | ............. A47C 3/027 |
| EP | 3279032   | A1| * | 2/2018  | ............... B60N 2/64 |
| JP | 2007325674| A |   | 12/2007 |            |
| JP | 2012228899| A | * | 11/2012 |            |

\* cited by examiner

SEAT CUSHION STRUCTURE CAPABLE OF ADJUSTING SOFTNESS AND HARDNESS

CROSS-REFERENCE TO RELATED APPLICATIONS

This application is a continuation of International Patent Application No. PCT/CN2020/091953 with a filing date of May 23, 2020, designating the United States, now pending, and further claims priority to Chinese Patent Application No. 202010198188.0 with a filing date of Mar. 19, 2020. The content of the aforementioned applications, including any intervening amendments thereto, are incorporated herein by reference.

TECHNICAL FIELD

The present disclosure relates to technical fields of seat structure, processing, especially relates to a seat cushion structure capable of adjusting softness and hardness.

BACKGROUND

At present, in the field of furniture seats or automobile seats, the softness and hardness of the seat cushions are mainly determined by air bags provided inside the seat cushions such that the seat gets more comfortable. For example, referring to an existing patent, tilted: vehicle seat with adjustable hardness, the Chinese patent number: 201310149041.2. As shown in FIG. 1, aeration quantity of the first air bag A, the second air bag B, the third air bag C and the fourth air bag D are adjusted by a plurality of air pressure control valves to control air pressure within the air bag, such that the softness and hardness of the seat cushion are adjusted accordingly.

The cushion structure as described above for adjusting softness and hardness has the following disadvantages:

1. The air bag itself will generate deformation when adjusting the air pressure therein, affecting appearance of the seat itself.
2. Different areas of the seat have different degrees of deformation in a process of charging or discharging air to the air bags, meaning uneven degree of softness and hardness of the seat.
3. The charging and discharging control system are complex as well as the air bags, thus the cost are high.
4. The charging and discharging speed of the charging and discharging system can restrain a speed of the seat adjusting softness and hardness, generally speaking, the adjusting time is too long.

SUMMARY

The present disclosure has been made in view of such circumstances. An object of the present disclosure is to provide a seat cushion structure capable of adjusting softness and hardness while not affecting an appearance of the seat cushion itself during the adjusting process, as well as an uniform adjusting range, a simple cushion structure, a quick reaction, a reliable function and a low cost.

In order to achieve the object and other related purposes, the present disclosure provides a cushion structure capable of adjusting softness and hardness, including a cushion sponge, a wheel-spoke seat inner housing, a seat sponge, a seat outer housing which are sequentially disposed from up to bottom; a coil spring is fixedly arranged inside the wheel-spoke seat inner housing; an adjusting handle is provided outside the seat outer housing, an adjustment mechanism is connected to the adjustment handle and provided inside the seat outer housing; the adjustment mechanism is also connected to the coil spring, configured for adjusting contraction radius of the coil spring.

In an embodiment, the adjustment mechanism includes a shell, a pulling-rope reel disposed inside the shell, a rubber clutch sheet, a gear pair and a drawstring; the adjustment handle is clamped with the gear pair; the gear pair, the rubber clutch sheet and the pulling-rope reel are arranged on the seat outer housing; the drawstring has one end with which the pulling-rope reel is connected with, and the other end with which the coil spring is connected with.

In an embodiment, the wheel-spoke seat inner housing is divided as at least two parts.

In an embodiment, the pulling-rope reel is opened with a slot, the slot is connected with the drawstring and the drawstring is rolled around the pulling-rope reel.

In an embodiment, the adjusting mechanism is fixedly set inside the seat outer housing via a bolt or a self-tapping screw.

In an embodiment, the seat outer housing is connected with the wheel-spoke seat inner housing by a bolt or a self-tapping screw.

As described above, a seat cushion capable of adjusting softness and hardness of the present disclosure has the following beneficial effects: adopting an engagement structure of the wheel-spoke seat inner housing and the coil spring to adjust a degree of softness and hardness of the seat cushion, has advantages of a simple cushion structure with convenient to adjust, quick reaction, reliable function and low cost.

Figure 1:
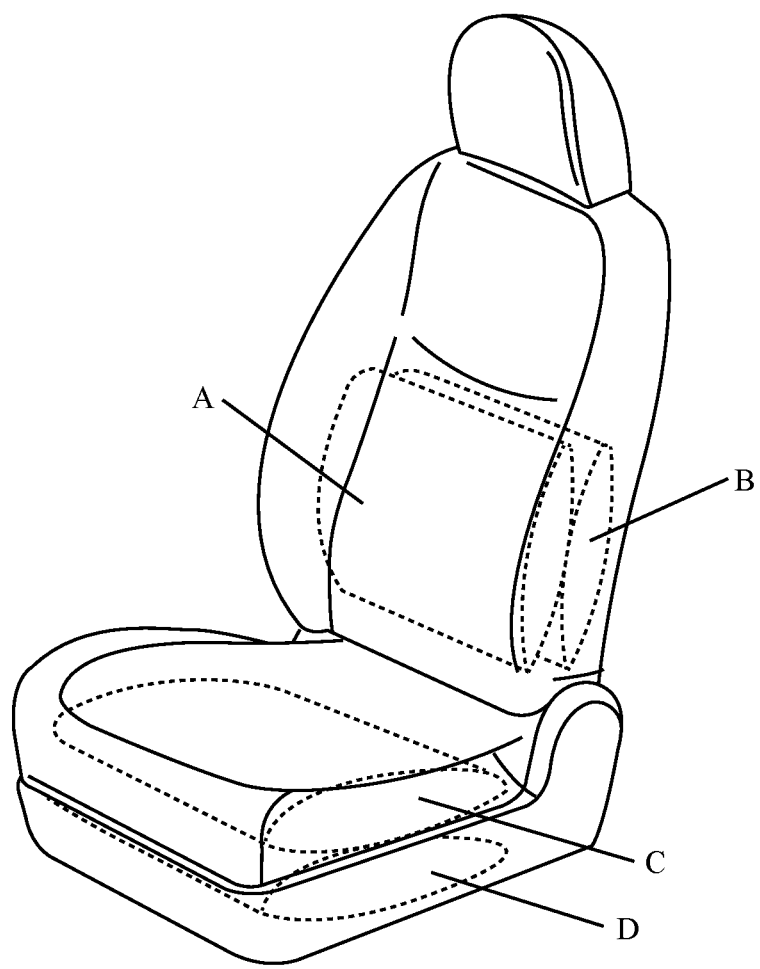
FIG. 1 is a schematic view of a seat cushion according to embodiments of the present disclosure.

In the drawings: A—a first air bag; B—a second air bag; C—a third air bag; D—a fourth air bag; 1—a cushion sponge, 2—a wheel—spoke seat inner housing, 3—a seat sponge, 4. a seat shell, 4.1—through hole, 5—an adjustment handle; 6—a pulling—rope reel; 6.1—a first lug boss; 6.2—a slot; 7—a rubber clutch sheet; 7.1—a groove; 8—a gear pair; 8.1—a small gear; 8.2—a large gear, 9—a drawstring, 10—a shell, 11—a coil spring.

DETAILED DESCRIPTION

An embodiment of the present disclosure will be described below while referring to the attached FIGS. 1 to 11.

First, please refer to FIG. 2 to FIG. 10, it is known that the structure shown in the attached drawing of the specification, proportion, size and so on, are only used for matching the content disclosed in the specification, for people familiar with the technology to understand and read, and not to define the invention can be implemented the defined condition, so it does not have the practical meaning of the technology, any structure of the modification; the change or the size of the proportional relationship is adjusted in the scope of the technical contents disclosed by the present disclosure, without affecting the efficacy and the purpose achieved by the present disclosure. At the same time, the citations in the specification as "on", "lower", "left", "right", "middle" and "one" and so on, are only for an object of clear and convenient to narrate, but not to limit the scope of the present disclosure, the change or adjustment of the relative relationship, without substantial change of technical content, should be considered to be within the scope of the disclosure.

Figure 2:
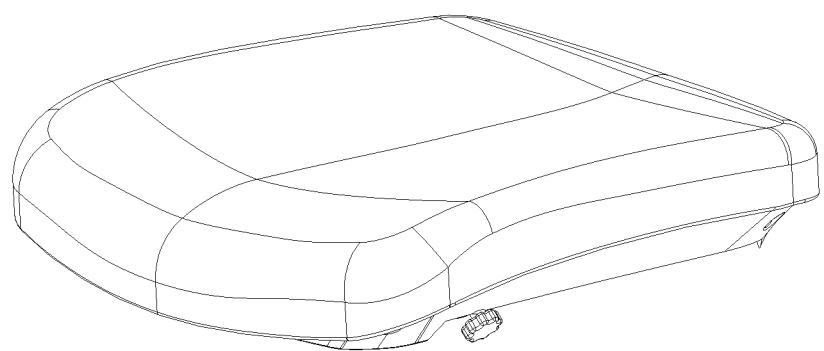
FIG. 2 is an overall schematic view of the seat cushion according to embodiments of the present disclosure.
Figure 3:
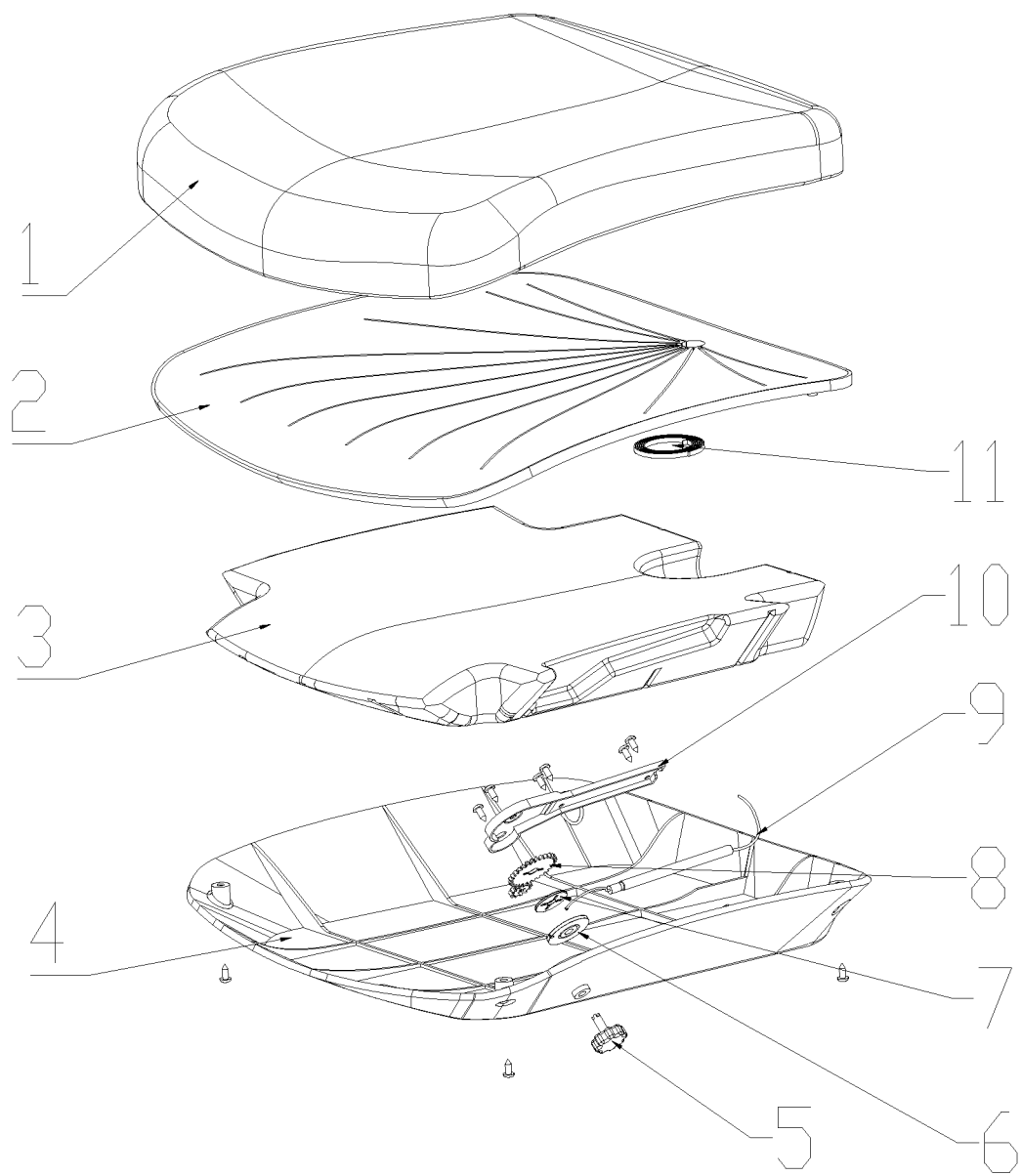
FIG. 3 is an exploded schematic view of the seat cushion according to embodiments of the present disclosure.
Figure 4:
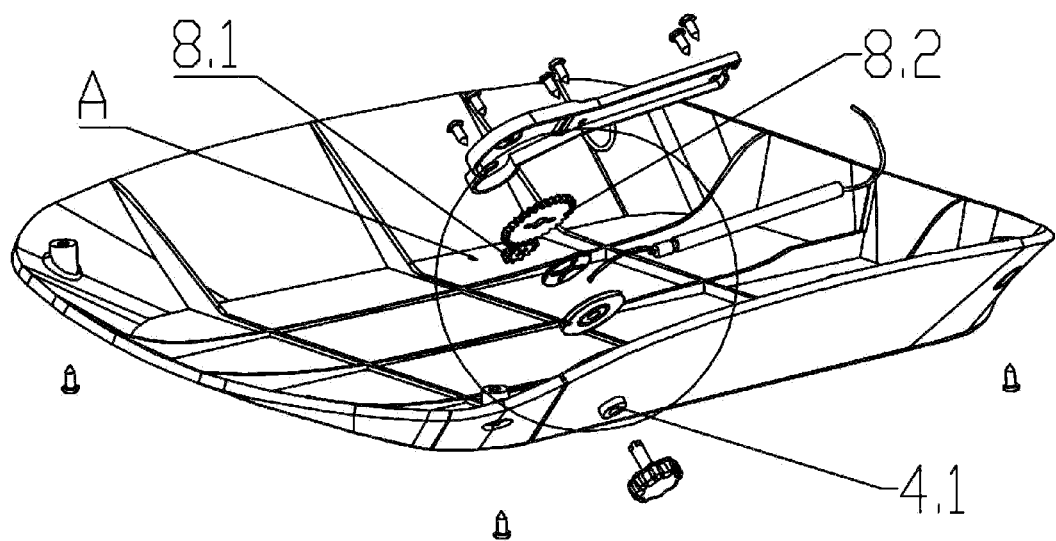
FIG. 4 is a schematic view of a seat outer housing according to embodiments of the present disclosure.
Figure 5:
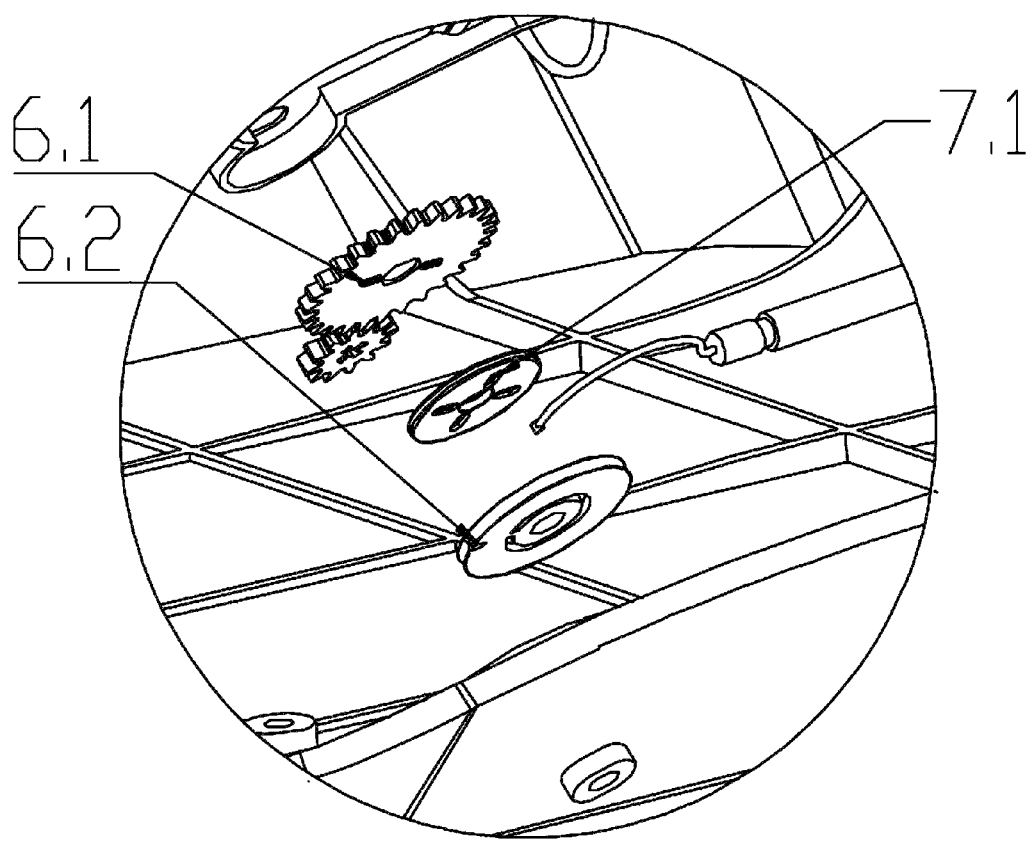
FIG. 5 is a partial enlarged view of A in FIG. 4.
Figure 6:
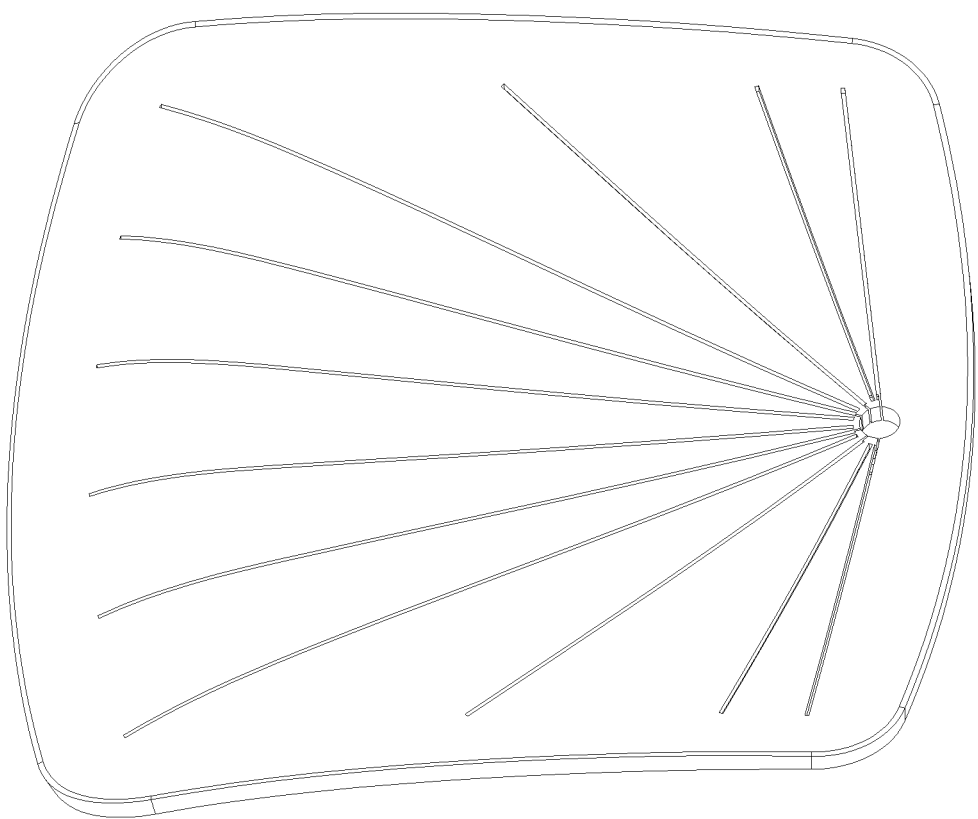
FIG. 6 is a front view of the wheel-spoke seat inner housing according to embodiments of the present disclosure.
Figure 7:
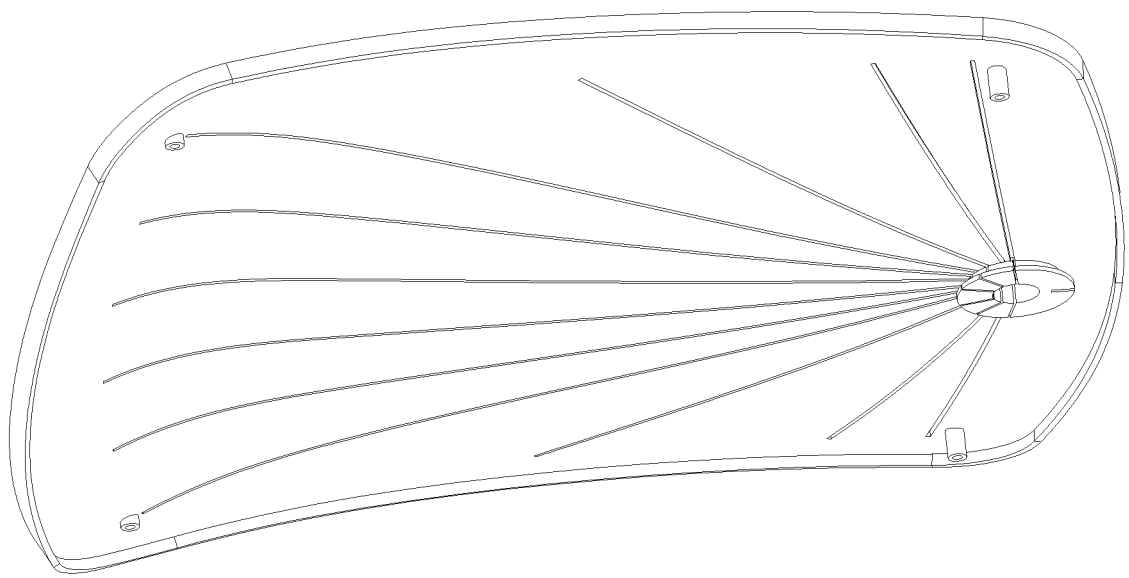
FIG. 7 is a rear view of the wheel-spoke seat inner housing according to embodiments of the present disclosure.
Figure 8:
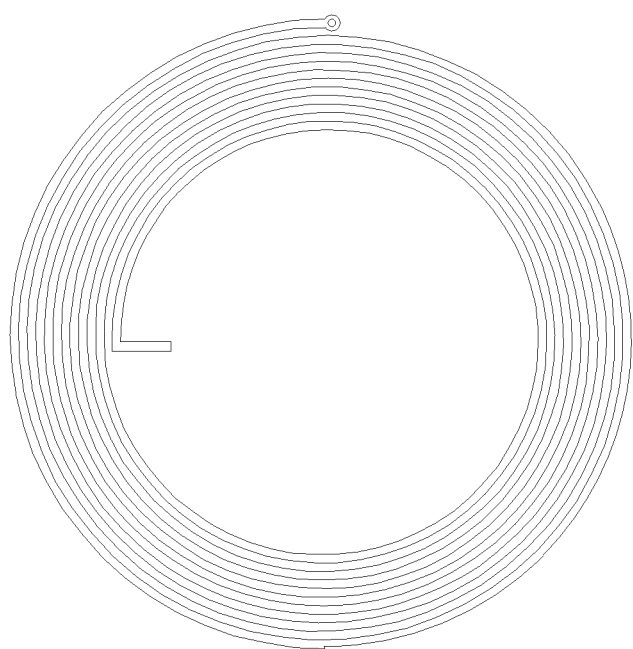
FIG. 8 is a schematic view of a coil spring according to embodiments of the present disclosure.
Figure 9:
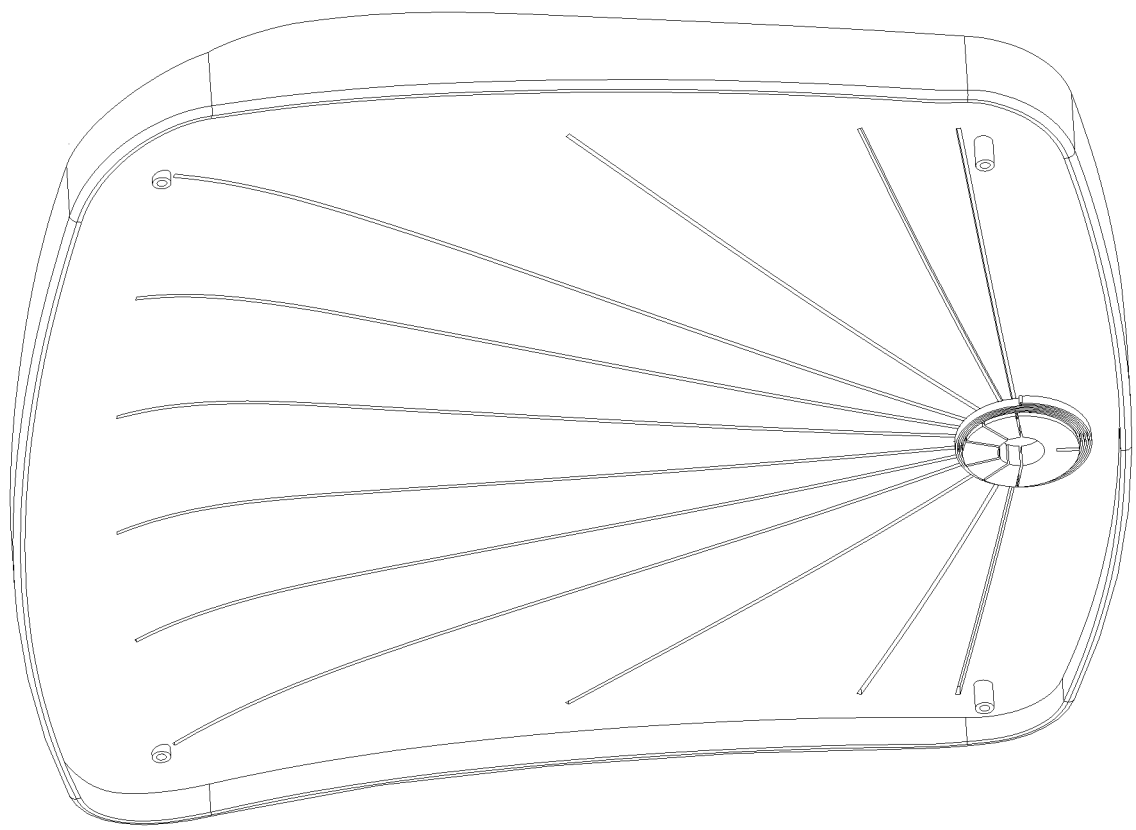
FIG. 9 is a schematic view in which the wheel-spoke seat inner housing assembled with the coil spring according to embodiments of the present disclosure.
Figure 10:
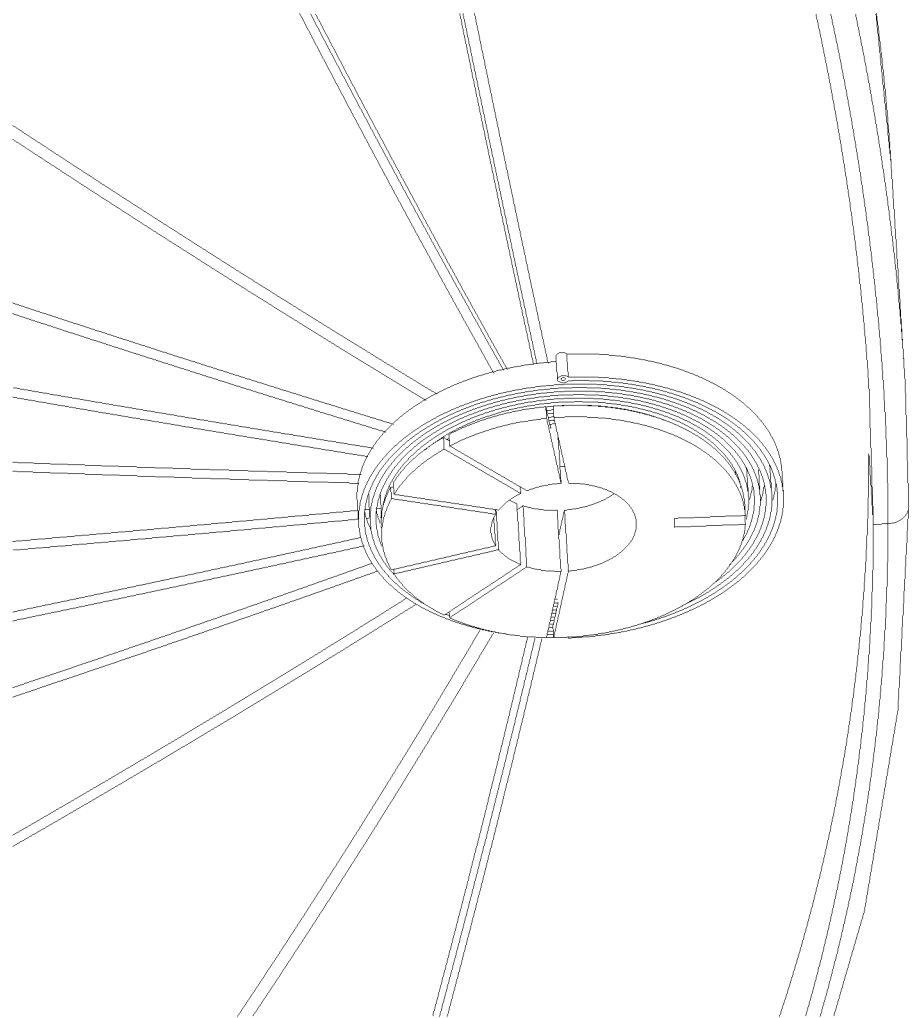
FIG. 10 is a partial enlarged view in which the wheel-spoke seat inner housing assembled with the coil spring according to embodiments of the present disclosure.
Figure 11:
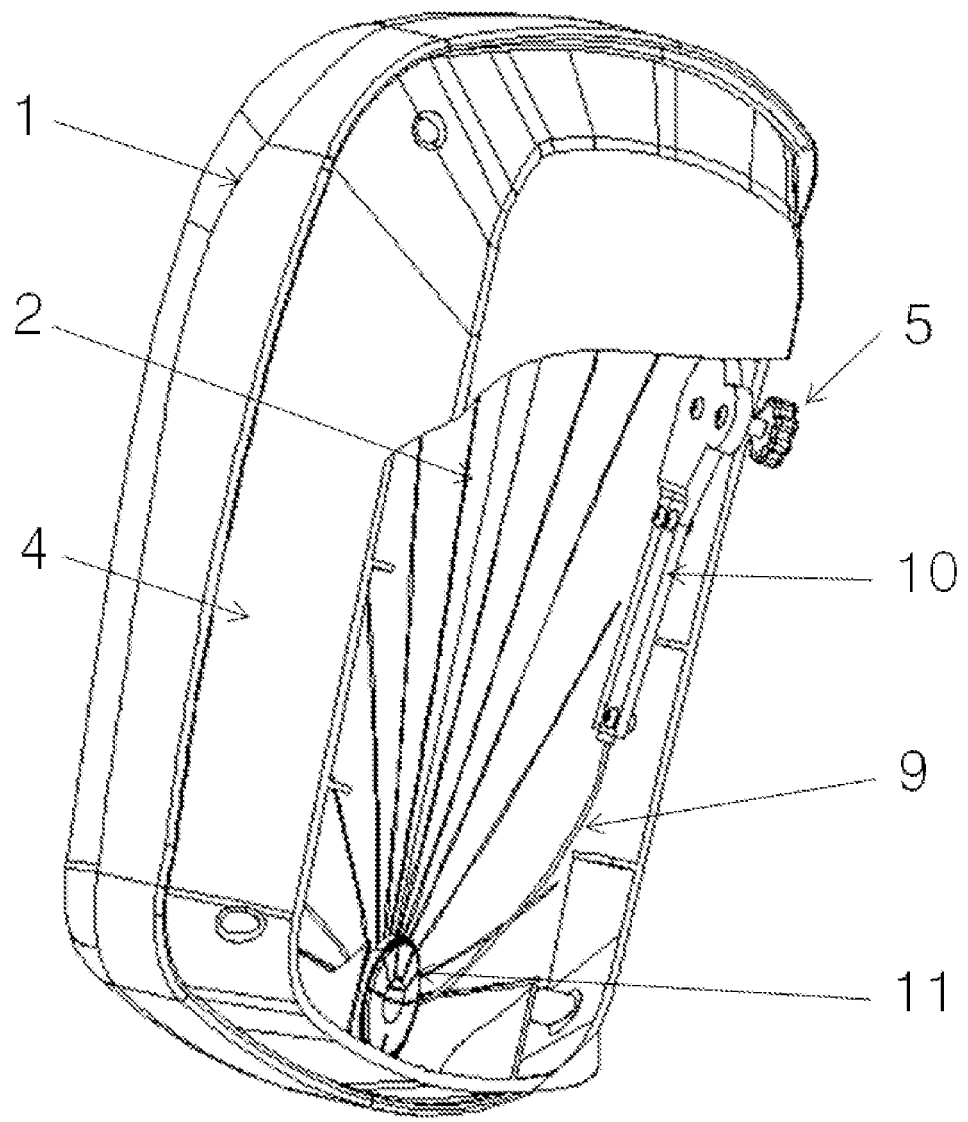
FIG. 11 is a partial sectional view in which the adjusting mechanism connected with the coil spring according to embodiments of the present disclosure.

As shown in FIG. 2, the present disclosure provides a seat cushion capable of adjusting softness and hardness, as shown in FIG. 3, the seat cushion comprises a cushion sponge 1, a wheel-spoke seat inner housing 2, a seat sponge 3, a seat outer housing 4 which are sequentially disposed from up to bottom; a coil spring 11 is fixedly arranged inside the wheel-spoke seat inner housing 2; an adjusting handle 5 is provided outside the seat outer housing 4, an adjustment mechanism is connected to the adjustment handle 5 and provided inside the seat outer housing 4; the adjustment mechanism is also connected to the coil spring 11, configured for adjusting contraction radius of the coil spring 11 such that the softness and hardness of the seat cushion may be adjusted, of which, the wheel-spoke seat inner housing 2 is divided into at least two parts.

Specifically, as shown in FIG. 4 to FIG. 10, the adjusting mechanism comprises a shell 10, a pulling-rope reel 6 set in the shell 10, a rubber clutch sheet 7, a gear pair 8 and a drawstring 9; the adjustment handle 5 is clamped with the gear pair 8; the gear pair 8, the rubber clutch sheet 7 and the pulling-rope reel 6 are pressed and installed on the seat shell 4; one end of the drawstring 9 is connected with the pulling-rope reel 6, the other end is connected with the coil spring 11. In this manner, the adjustment handle 5 passes through the through hole 4.1 that is opened on the seat shell 4 to be sap jointed with the smaller gear 8.1 of the gear pair 8. The bigger gear 8.2 of the gear pair 8, the rubber clutch sheet 7 and the pulling-rope reel 6 pressed together as a whole is assembled on a mounting column (not shown in FIGs) set on the seat outer housing 4 via a central hole formed by the cored bigger gear 8.1, the cored rubber clutch sheet 7 and the cored pulling-rope reel 6, coved by the shell 10. The shell 10 is provided with two screw holes, one is locked to the adjustment handle 5 to fix the adjustment handle 5 and the small gear 8.1 by utilizing a self-tapping screw, the other one is locked to the mounting column of the seat outer housing 4 by utilizing the self-tapping screw so as to tightly fix the pulling-rope reel 6, the rubber clutch sheet 7 and the bigger gear 8.2, in such a manner, the pulling-rope reel 6, the rubber clutch sheet s7 and the bigger gear 8.2 are all connected with the mounting column.

The working principle of the adjusting mechanism is as follows: by rotating the adjustment handle 5, the adjustment handle 5 drives the smaller gear 8.1, the smaller gear 8.1 drives the bigger gear 8.2, the bigger gear 8.2 drives the pulling-rope reel 6 to rotate via the rubber clutch sheet 7, to realize the pulling-rope reel 6 to pull or release the drawstring 9. In an embodiment, the rubber clutch sheet 7 has a front surface and an opposite back surface on which two grooves 7.1 are respectively set, the bigger gear 8.2 has a first lug boss 6.1 and the pulling-rope reel 6 has a second lug boss (not shown). The first lug boss 6.1 and the second lug boss are respectively clamped with two grooves 7.1 respectively set on the front surface and the back surface of the rubber clutch sheet 7, engaged with the rubber clutch sheet 7 to transmit power. Since the rubber clutch sheet 7 is made of soft materials, the main function is to transmit power in its normal state, but when the rubber clutch sheet 7 is adjusted to a limit position, as if continuously adjusting would cause a skid such that the other components cannot be damaged accordingly. At the same time, the grooves 7.1 set on the rubber clutch sheet plate 7 would generate vibration and sound due to the skid caused by the engagement of the first lug boss 6.1 and the second lug boss with rubber clutch sheet plate Iso as to remind the user that the rubber clutch sheet 7 has reached a limit position.

In an embodiment, the pulling-rope reel 6 has a slot 6.2 with which the drawstring 9 is connected, the drawstring 9 is rolled around the pulling-rope reel.

In an embodiment, the adjusting mechanism is fixedly set inside the seat outer housing 4 via a bolt or a self-tapping screw; the seat outer housing 4 is connected with the wheel-spoke seat inner housing 2 by a bolt or a self-tapping screw.

The working principle of the present disclosure is as follows:

By rotating the adjustment handle 5, the adjustment handle 5 drives the smaller gear 8.1, the smaller gear 8.1 drives the bigger gear 8.2 and the bigger gear 8.2 drives the drawstring 6 to rotate via the rubber clutch sheet 7, such that the pulling-rope reel 6 can pull or release the drawstring 9. The drawstring 9 is connected with the coil spring 11, the coil spring 11 is fixed on the wheel-spoke seat inner housing 2. By adjusting a length degree of pulling or releasing the drawstring 9 to adjust a construction radius of the coil spring 11, a sinking depth of the wheel-spoke seat inner housing 2 is controlled when loaded. The different sinking depth can change contact area between the user and the seat cushion. With a premise constant weight, the change of the contact area makes the pressure to change, such that the user can feel the change of softness and hardness of the seat cushion, at the same time, the sinking depth of the user sitting on the seat cushion is changed accordingly, which can further strengthen the comfort degree. The two change effects are overlapped so as to adjust the sitting feeling of softness and hardness of the seat cushion.

The above described is a working principle of common seat cushions operated manually operation, when the seat cushion structure is applied to the automobile seat that needs to be changed from the manual adjusting mode to the automatic adjusting mode, it can remove the seat sponge 3 in the seat by replacing an air bag therein. The effect of the air bag is that the user can adjust the hardness and comfort degree under the premise that the user is not separated from the seat. The specific working principle is as follows: when the seat cushion is needed to be adjusted, the air pressure in the air bag is increased by operating the control valve in the air bag, rising the user and reducing the sinking depth of the wheel-spoke inner housing 2 such that the coil spring 11 is in a relaxing state aiding to conveniently tighten the coil spring 11, so as to conveniently adjust the seat feeling of the cushion. When the seat cushion needs to be adjusted softer, discharging the air in the air bag can make the wheel-spoke inner housing 2 descend and then adjust the rolling spring tightening the contraction radius so as to make the seat cushion feel softer.

In an embodiment, the core principles of manually adjusting sitting mode and automatically adjusting the sitting feeling are the same, both composed of the wheel-poke inner housing 2, the coil spring 11 and the drawstring 9, both by controlling the sinking depth of the cushion and the contact area between the cushion and the user to adjust the hardness comfort, except that specific adjusting structures are different.

In summary, the present disclosure can adjust the cushion hardness comfort, at the same time, it will not affect the appearance of the seat cushion itself in the adjusting process; the adjusting range is uniform; the cushion structure is simple; the reaction is quick; the function is reliable and the cost is low. Therefore, the present disclosure effectively overcomes the disadvantages in the existing technologies and has high industrial utilization value.

An embodiment of the present disclosure has been heretofore described above. However, the present disclosure is not limited to the aforementioned embodiment, and various design modifications can be made without departing from the gist of the present disclosure. Any person skilled in the art will be able to modify or alter the above embodiments without departing from the spirit and scope of the invention. Therefore, in the technical field of the invention, it has ordinary knowledge of all equivalent modifications or changes without departing from the spirit and technical idea disclosed by the invention, it should be covered by the claims of the invention.

What is claimed is:

1. A cushion structure capable of adjusting softness and hardness, comprising:
   a cushion sponge (1);
   a wheel-spoke seat inner housing (2);
   a seat sponge (3); and
   a seat outer housing (4);
   wherein, the cushion sponge (1), the wheel-spoke seat inner housing (2), the seat sponge (3) and the seat outer housing (4) are sequentially disposed from up to bottom; a coil spring (11) is fixedly arranged inside the wheel-spoke seat inner housing (2); an adjusting handle (5) is provided outside the seat outer housing (4), an adjustment mechanism is connected to the adjustment handle (5) and provided inside the seat outer housing (4); the adjustment mechanism is also connected to the coil spring (11), configured for adjusting contraction radius of the coil spring (11).

2. The cushion structure capable of adjusting softness and hardness according to claim 1, wherein the wheel-spoke seat inner housing (4) is divided as at least two parts.

3. The cushion structure capable of adjusting softness and hardness according to claim 1, wherein the adjustment mechanism includes a shell (10), a pulling-rope reel (6) disposed inside the shell (10), a rubber clutch sheet (7), a gear pair (8) and a drawstring (9); the adjustment handle (5) is clamped with the gear pair (8); the gear pair (8), the rubber clutch sheet (7) and the pulling-rope reel (6) are arranged on the seat outer housing (4); the drawstring (9) has one end with which the pulling-rope reel (6) is connected with, and the other end with which the coil spring (11) is connected with.

4. The cushion structure capable of adjusting softness and hardness according to claim 3, wherein
   the pulling-rope reel (6) is opened with a slot (6.2), the slot (6.2) is connected with the drawstring (9) and the drawstring (9) is rolled around the pulling-rope reel (6).

5. The cushion structure capable of adjusting softness and hardness according to claim 3, wherein the adjusting mechanism is fixedly set inside the seat outer housing (4) via a bolt or a self-tapping screw.

6. The cushion structure capable of adjusting softness and hardness according to claim 1, wherein the seat outer housing (4) is connected with the wheel-spoke seat inner housing (2) by a bolt or a self-tapping screw.

7. The cushion structure capable of adjusting softness and hardness according to claim 1, wherein the seat sponge (3) are replaced by other elastic components.

* * * * *